US007494049B2

(12) United States Patent
Ahn et al.

(10) Patent No.: US 7,494,049 B2
(45) Date of Patent: Feb. 24, 2009

(54) SHUTTER MECHANISM OF AUTOMATED-TELLER MACHINE

(75) Inventors: Jin Hyuk Ahn, Suwon-Si (KR); Won Joon Lee, Seoul (KR); Dong Sik Lee, Seoul (KR); You Hoon Yoon, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 599 days.

(21) Appl. No.: 11/134,258

(22) Filed: May 23, 2005

(65) Prior Publication Data

US 2005/0284925 A1 Dec. 29, 2005

(30) Foreign Application Priority Data

Jun. 29, 2004 (KR) ...................... 10-2004-0049737

(51) Int. Cl.
*G06F 17/60* (2006.01)

(52) U.S. Cl. ....................................... 235/379; 235/441

(58) Field of Classification Search ................. 235/379, 235/382, 441; 902/9, 12
See application file for complete search history.

(56) References Cited

U.S. PATENT DOCUMENTS 4,638,746 A * 1/1987 Ishigure ....................... 109/52
4,733,765 A * 3/1988 Watanabe ................... 194/206
6,176,423 B1 * 1/2001 Egami ........................ 235/379
6,843,409 B2 * 1/2005 Park ........................... 232/1 D

* cited by examiner

*Primary Examiner*—Daniel St.Cyr
(74) *Attorney, Agent, or Firm*—Fish & Richardson P.C.

(57) ABSTRACT

A shutter mechanism of an automated-teller machine according to the present invention comprises a main body including a frame, a shutter slidably coupled to a front side of the frame, a first protrusion protruding inward on an inner lateral surface of the shutter, and a fixing member protruding on a side surface of the frame; an opening/closing means for opening and closing the shutter in response to an external signal; a locking unit for preventing the shutter from being opened by an external force without a separate signal; and a driving unit for simultaneously operating the opening/closing unit and the locking unit. Therefore, the present invention provides a shutter mechanism of an automated-teller machine, wherein a shutter-opening/closing operation and a shutter-locking operation can be simultaneously carried out using a single driving source, thereby simplifying its structure and also reducing its production costs, and interference that may occur while the shutter is being closed does not impose a load on the driving source, thereby preventing damage to and malfunction of the mechanism, reducing a failure rate and also maintaining a smooth operational state.

7 Claims, 4 Drawing Sheets

SHUTTER MECHANISM OF AUTOMATED-TELLER MACHINE

BACKGROUND OF THE INVENTION

1. Field of the Invention

The present invention relates to a shutter mechanism of an automated-teller machine, and more particularly, to a shutter mechanism of an automated-teller machine, which has a simplified structure for opening and closing a shutter that is to be opened when a bank note is deposited or withdrawn, and is provided with a means capable of coping with a case where interference occurs during a shutter-closing process.

2. Description of the Related Art

In general, an automated-teller machine is used by banks or other financial institutions in order to provide a convenient banking service to their customers. The automated-teller machine is installed in convenience stores or public places in addition to the premises of the banks or financial institutions, and is configured such that customers can deposit or withdraw cash money conveniently whenever needed, using a cash card or a credit card.

Recently, such an automated-teller machine has come to be utilized to issue a transaction record for confirming the transaction history of a virtual account, or various certificates from governmental or educational institutions, along with the money deposit and withdrawal to and from financial institutions.

Such an automated-teller machine is provided with a shutter for covering a cash receiving part through which cash can be deposited or withdrawn, so that the cash receiving part cannot be exposed to the outside. Such a cash receiving part with a shutter is to be designed to be easily operated by a user and to retain a closed state against any forcible opening attempt. In addition, when interference occurs by a user's hand, wallet, passbook, or the like while the shutter is being closed, the shutter should stop the closing operation.

However, in the conventional shutter mechanism, the shutter is configured to be opened and closed by a motor, and the locking operation of the shutter is performed through a separate motor or solenoid. That is, these separate driving power sources lead to a complicated structure of the whole system, an increase in failure frequency, and increased production costs.

SUMMARY OF THE INVENTION

The present invention is conceived to solve the aforementioned problems in the art. An object of the present invention is to provide a shutter mechanism of an automated-teller machine, wherein a shutter-opening/closing operation and a shutter-locking operation can be simultaneously carried out using a single driving source, thereby simplifying its structure and also reducing its production costs, and interference that may occur while the shutter is being closed does not impose a load on the driving source, thereby preventing damage to and malfunction of the mechanism, reducing a failure rate and also maintaining a smooth operational state.

According to the present invention for achieving the object, there is provided a shutter mechanism of an automated-teller machine, comprising a main body including a frame, a shutter slidably coupled to a front side of the frame, a first protrusion protruding inward on an inner lateral surface of the shutter, and a fixing member protruding on a side surface of the frame; an opening/closing means for opening and closing the shutter in response to an external signal; a locking unit for preventing the shutter from being opened by an external force without a separate signal; and a driving unit for simultaneously operating the opening/closing unit and the locking unit.

Further, the opening/closing unit may include a first operation member having one end connected to the first protrusion and pivotably connected to the frame through a first rotational shaft, a first spring for causing the first operation member to be elastically supported by the fixing member, and a second protrusion formed on one surface of the first operation member to protrude toward the frame. The locking unit may include a second operation member provided between the fame and the first operation member and pivotably connected to the frame through a second rotational shaft, a catching step formed to protrude from the second operation member and placed below the second protrusion, and a second spring for causing the second operation member to be elastically supported by the fixing member. The driving unit may include a motor and a cam coupled to a driving shaft of the motor.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a preferred embodiment of the invention will be described in detail with reference to the accompanying drawings.

Figure 1:
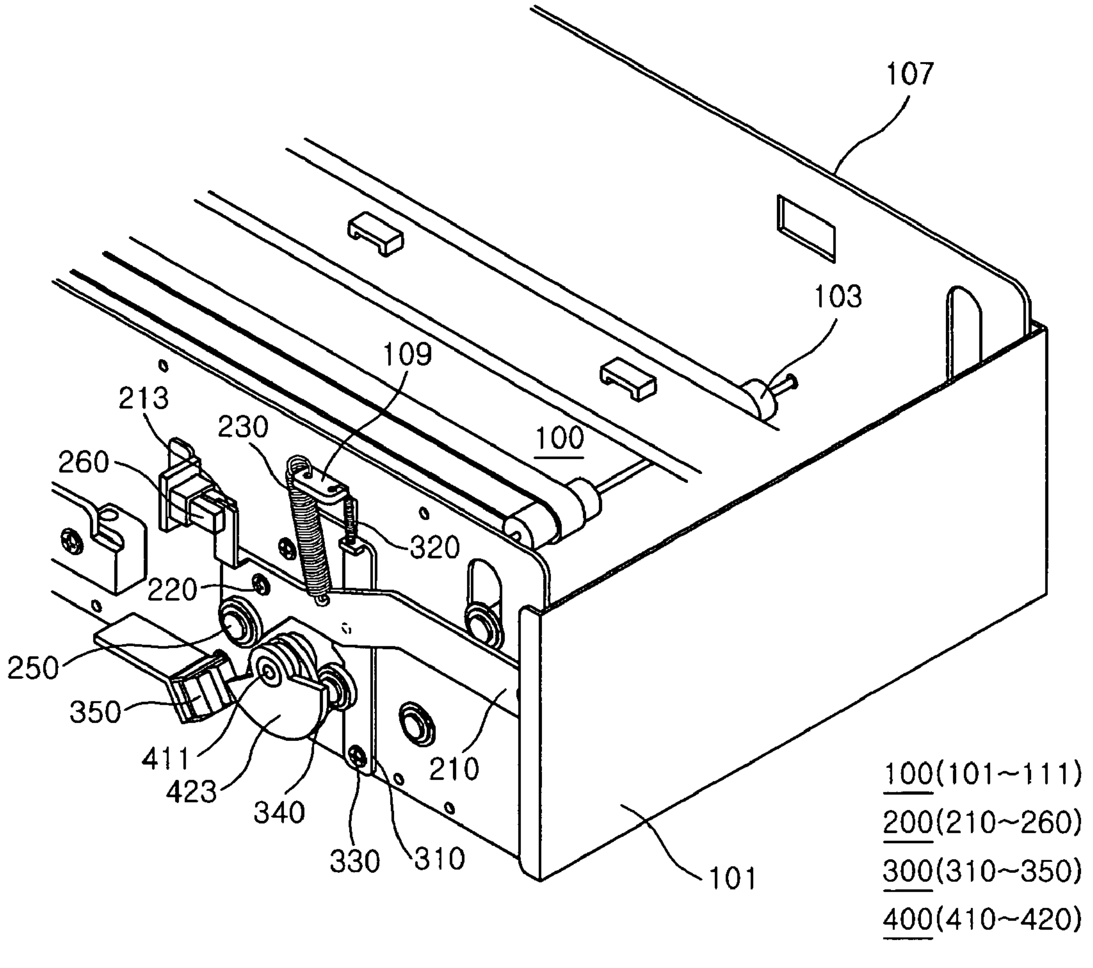
FIG. 1 is a perspective view of a shutter mechanism of an automated-teller machine according to the invention.
Figure 2:
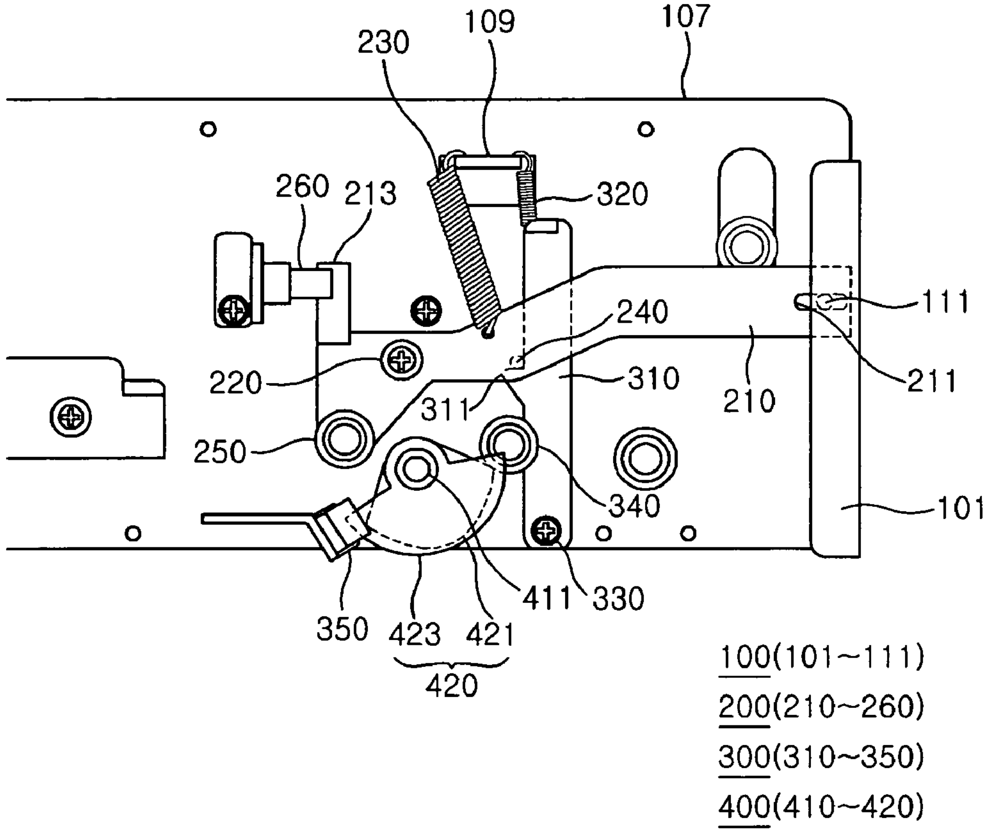
FIG. 2 is a side view of the shutter mechanism of an automated-teller machine according to the invention.

FIG. 1 is a perspective view of a shutter mechanism of an automated-teller machine according to the invention, and FIG. 2 is a side view of the shutter mechanism of an automated-teller machine according to the invention.

The shutter mechanism of the invention comprises a main body 100 including a shutter 101, an opening/closing unit 200 for opening and closing the shutter 101 in response to an external signal, a locking unit 300 for preventing the shutter 101 from being opened by an external force without any separate signal, and a driving unit 400 for simultaneously operating the opening/closing unit 200 and the locking unit 300.

In the following description, the term "front" or "forward" is defined as indicating a side where the shutter 101 is provided in the main body 100, and the term "rear" or "backward" is defined as indicating an opposite side.

The main body 100 is to transfer a bank note using a transfer roller 103 provided therein, and comprises a frame 107 having a cash receiving part at the front inside thereof, and a shutter 101 for covering and revealing the cash receiving part. Here, the shutter 101 is placed in front of the cash receiving part and slidably coupled to the frame 107. In addition, a fixing member 109 is formed to protrude outward on a side surface of the frame 107, and a first protrusion 111 is formed to protrude inward on an inner lateral surface of the shutter 101.

The opening/closing unit 200 comprises a first operation member 210 for opening and closing the shutter 101 through a pivot motion thereof, a first rotational shaft 220 acting as a pivot point of the first operation member 210, a first spring 230 exerting a tension force on the first operation member 210 in a direction opposite to the pivot motion thereof, and a second protrusion 240 for preventing the first operation member 210 from pivoting due to its own weight.

Here, the first operation member 210 has a crank-like shape having a higher front portion and a lower rear portion, and is placed to be spaced apart from the frame 107 by a certain distance. An elongated connection hole 211 is formed at a front end of the first operation member 210, and the first protrusion 111 is inserted into and connected to the connection hole. The first rotational shaft 220 is provided at a rear end of the first operation member 210 so that the first operation member 210 can be pivotably coupled to the frame 107 via the first rotational shaft 220. Here, the first spring 230 is coupled between the fixing member 109 and the first operation member 210.

The locking unit 300 comprises a second operation member 310 for automatically locking the shutter 101 and maintaining the locked state thereof, a catching step 311 for preventing the first operation member 310 from pivoting due to its own weight or an external force, and a second spring 320 for exerting a tension force on the second operation member 310 in a direction opposite to the pivot motion thereof.

Here, the second operation member 310 is placed between the fame 107 and the first operation member 210, and an upper portion thereof is fixed to the fixing member 109 via the second spring 320 and a lower portion thereof is pivotably coupled to the frame 107 via a second rotational shaft 330. In addition, the catching step 311 is formed in the second operation member 310 to take the shape of an inverted right-angled triangle, and the second projection 240 of the first operation member 210 is seated on the catching step 311.

The driving unit 400 comprises a motor (not shown) and a cam 420 coupled to a driving shaft 411 of the motor.

Here, the motor is provided inside the frame 107, and the driving shaft 411 passes through the fame 107 and then protrudes outside. The cam 420 comprises a first cam 421 for pivoting the first and second operation members 210 and 310, and a second cam 423 for indicating the rotated position of the first cam 421. The first and second cams 421 and 423 are coupled in this order with respect to the frame 107.

On the other hand, the first and second operation members 210 and 310 pivoted by the first cam 421 are further provided with rollers 250 and 340, respectively, which are rotated by being engaged with the first cam 421. The first operation member 210 is provided with the first roller 250 at a rear lower end thereof and the second operation member 310 is provided with the second roller 340 to protrude at a lower rear side thereof.

In addition, the first operation member 210 is provided with a sensing piece 213 at a rear upper end thereof, in order to detect the opened or closed state of the shutter 101. A first sensor 260 is provided at a position where the sensing piece 213 is placed when the shutter 101 is closed. Furthermore, a second sensor 350 for sensing the rotated position of the cam 420 is provided at one side of the second cam 421. Here, the first sensor 260 is to detect whether the shutter 101 is opened or closed by sensing the position of the sensing piece 213. The second sensor 350 is to control the start and end of the shutter-opening/closing process by sensing the second cam 423.

Figure 3A:
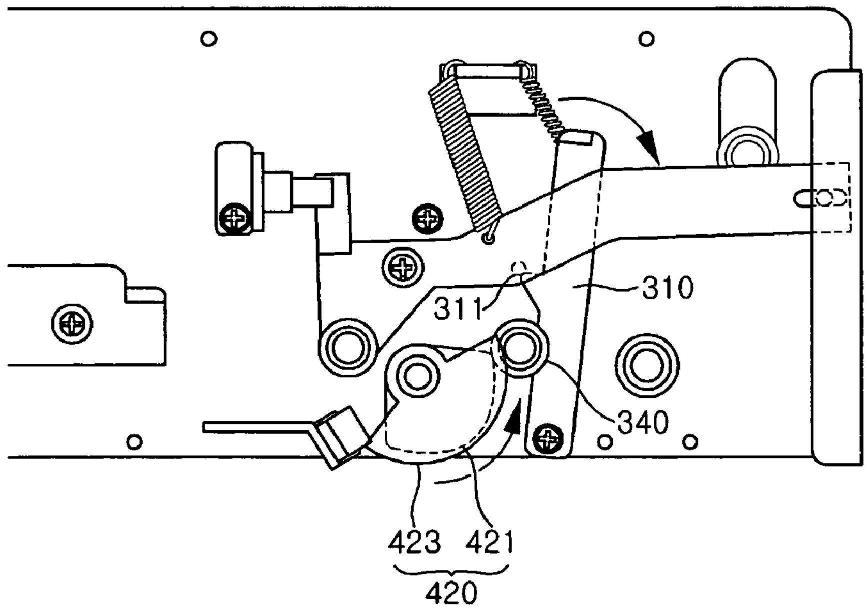
FIGS. 3*a* to 3*c* show a process in which a shutter of the shutter mechanism of an automated-teller machine according to the invention is being opened.
Figure 3B:
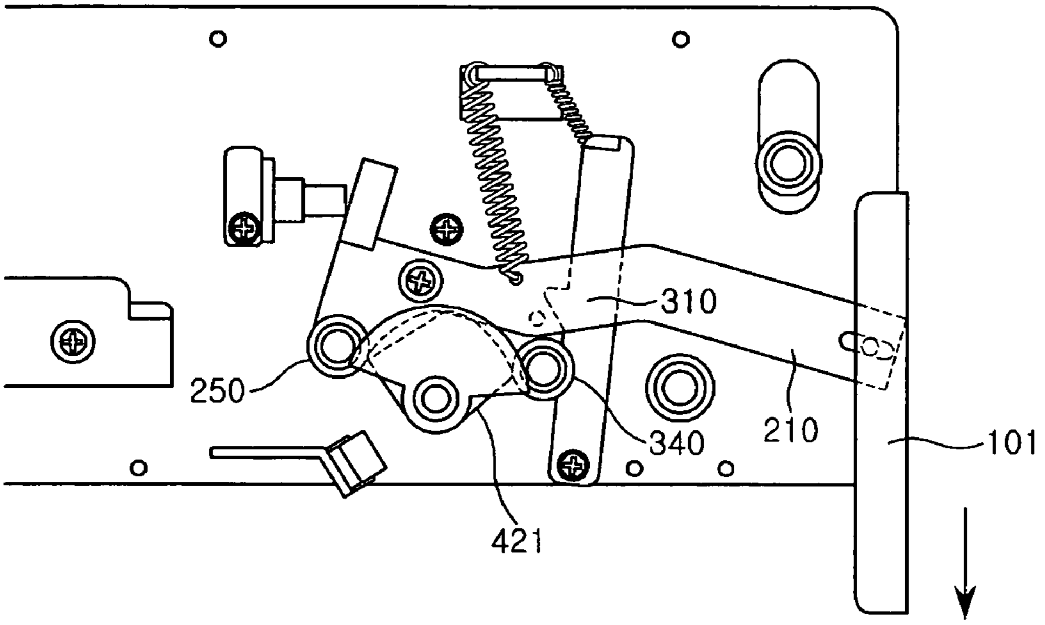
Figure 3C:
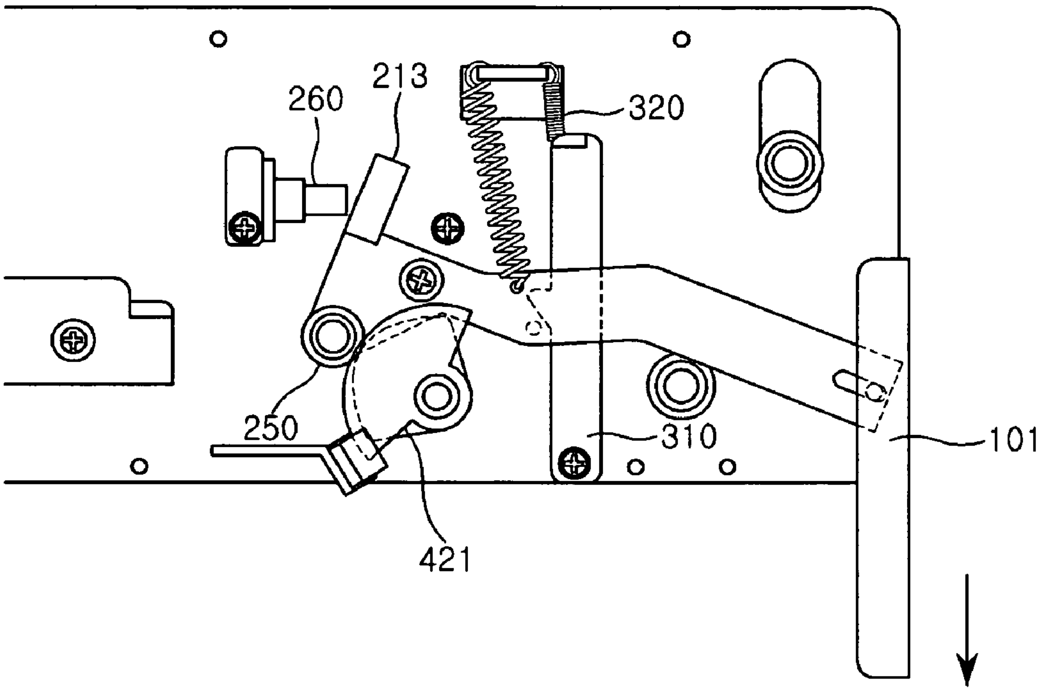
Figure 4A:
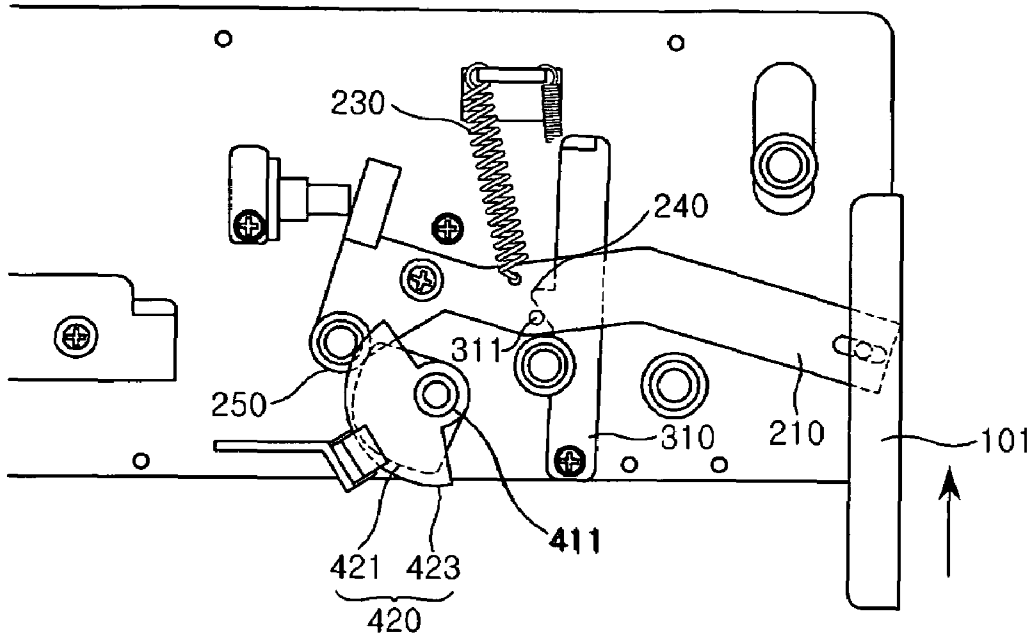
FIGS. 4*a* and 4*b* show a process in which the opened shutter of FIG. 3 is being closed.
Figure 4B:
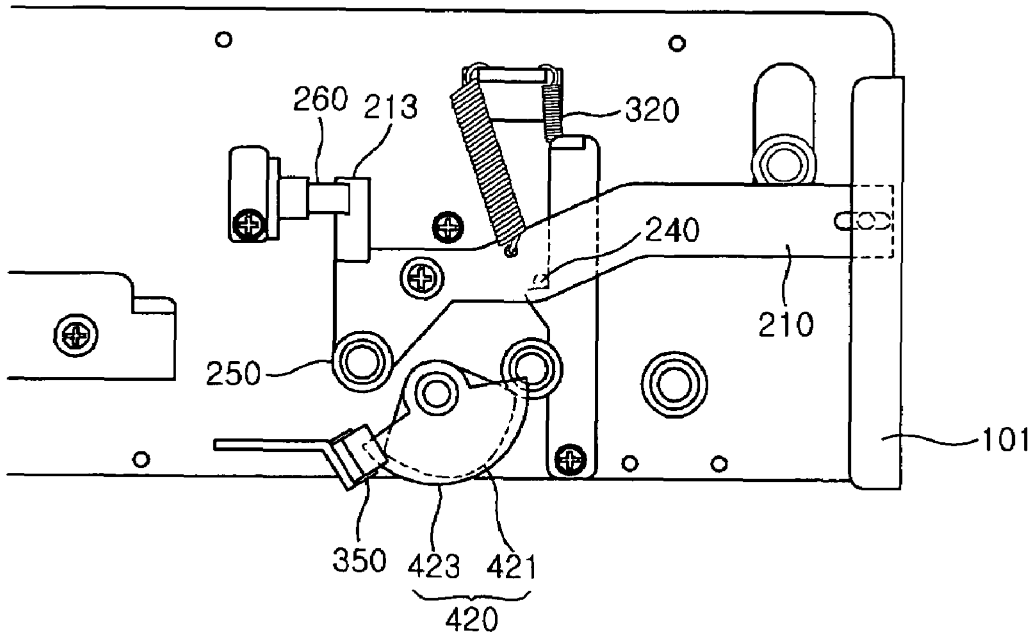

FIGS. 3*a* to 3*c* show a process in which the shutter of the shutter mechanism of an automated-teller machine according to the invention is being opened, and FIGS. 4*a* and 4*b* show a process in which the opened shutter of FIG. 3 is being closed.

The shutter is opened and closed at the time of both deposit and withdrawal. Here, the opening/closing operation thereof will be described in connection with a deposit process.

First, the opening operation of the shutter will be explained with reference to FIG. 3*a*. As shown in FIG. 3*a*, in order to deposit money, a user inserts his/her card into an automatic-teller machine and then presses a deposit button on an operation panel. Then, a motor (not shown) is driven in response to an input signal from the operation panel, and the cam 420 coupled to the driving shaft 411 of the motor is rotated. The first cam 421 of the cam 420 comes into contact with the second roller 340, and the second operation member 310 is pivoted so that the second projection 240 comes out from the catching step 311, thereby releasing the locked state.

When the first cam 421 is further rotated to come into contact with the first roller 250, the first operation member 210 is pivoted to cause the shutter 101, which is connected to one end of the first operation member, to slidably descend, as shown in FIG. 3*b*. At this time, the first cam 421 simultaneously come into contact with the first and second rollers 250 and 340, thereby pivoting the first and second operation members 210 and 310. Thus, the shutter 101 is released from the locked state thereof by the second operation member 310 and simultaneously opened by the first operation member 210.

FIG. 3*c* shows a state where the shutter is completely opened. When the first cam 421 is further rotated and a portion of the first cam on a major axis thereof comes into contact with the first roller 250, the shutter 101 is completely opened and the second operation member 310 is returned to its original position by the action of the second spring 320. In addition, the sensing piece 213 completely escapes from the sensing range of the first sensor 260, and at the same time, the motor is stopped to retain the opened state of the shutter 101. That is, the opening operation of the shutter is finished.

On the other hand, the closing operation of the shutter will be described with reference to FIG. 4*a*. When a shutter-closing signal is received from the outside, the motor (not shown) is rotated again and the cam 420 coupled to the driving shaft 411 of the motor is also rotated. Then, the first cam 421 departs from the first roller 250 and the first operation member 210 is returned to its original position by the action of the first spring 230. At the same time, the second projection 240 moves along a lower slant surface of the catching step 311 and the second operation member 310 also is pivoted by a certain angle. At this time, the shutter 101 is slid to be closed by the first operation member 210.

As shown in FIG. 4*b*, when the first cam 421 is further rotated and spaced apart from the first roller 250, the first operation member 210 is returned to its original position and the sensing plate 213 is also returned to its original position that falls within the sensing range of the first sensor 260. At the same time, the second projection 240 moves to the top of the catching step 240 and the second operation member 210 is returned to its original position by the action of the second spring 320, thereby completing the closing and locking of the shutter 101 at one time. Then, the motor stops its operation to retain the locked state of the shutter 101.

In the aforementioned shutter-closing operation, when the first cam 421 departs from the first roller 250, the second cam 423 enters the sensing range of the second sensor 350 and remains within the sensing range thereof until the shutter 101 is completely closed.

If any interference occurs when the shutter 101 is being closed, the shutter 101 is stopped. The motor is operated until the second cam 423 comes out from the sensing range of the second sensor 350, and then stopped. Thus, the motor can be protected from damage due to overload, which may be produced by interference at the shutter, and at the same time, a money withdrawing process is interrupted since sensing is not made by both the first and second sensors 260 and 350.

As described above, the shutter mechanism of an automated-teller machine according to the invention has advantages in that a shutter-opening/closing operation and a shutter-locking operation are carried out simultaneously by a single driving source, thereby simplifying its structure and also reducing production costs. In addition, interference, which may occur while the shutter is being closed, does not impose a load on the driving source, thereby preventing damage to and malfunction of the mechanism and also retaining a smooth operational state.

Although the structure and operation of the shutter mechanism of an automated-teller machine according to the present invention have been illustrated and described in connection with the preferred embodiment, it is only for illustrative purposes. It will be readily understood by those skilled in the art that various modifications and changes can be made thereto without departing from the spirit and scope of the present invention defined by the appended claims.

What is claimed is:

1. A shutter mechanism of an automated-teller machine, for selectively opening and closing a cash receiving part in the automated-teller machine, comprising:

a main body including a frame, a shutter slidably coupled to front side of the frame, a first protrusion protruding inward on an inner lateral surface of the shutter, and a fixing member protruding on a side surface of the frame;

an opening/closing unit, for opening and closing the shutter in response to an external signal, including a first operation member having one end connected to the first protrusion and pivotably connected to the frame through a first rotational shaft, a first spring for causing the first operation member to be elastically supported by the fixing member, and a second protrusion formed on one surface of the first operation member to protrude toward the frame;

a locking unit, for preventing the shutter from being opened by an external force without a separate signal, including a second operation member provided between the frame and the first operation member and pivotably connected to the frame through a second rotational shaft, a catching step formed to protrude from the second operation member and placed below the second protrusion, and a second spring for causing the second operation member to be elastically supported by the fixing member; and a driving unit for simultaneously operating the opening/closing unit and the locking unit.

2. The shutter mechanism as claimed in claim 1, wherein the driving unit includes a motor and a cam coupled to a driving shaft of the motor.

3. The shutter mechanism as claimed in claim 2, wherein the opening/closing unit further includes a first sensor for sensing an opened/closed state of the shutter; and the driving unit further includes a second sensor for sensing a rotated position of the cam.

4. The shutter mechanism as claimed in claim 3, wherein the cam includes a first cam for pivoting the first and second operation members, and a second cam for indicating a rotated position of the first cam.

5. The shutter mechanism as claimed in claim 2, wherein the first and second operation members are further provided with rollers that are rotated by being engaged with the cam, respectively.

6. The shutter mechanism as claimed in claim 3, wherein the first and second operation members are further provided with rollers that are rotated by being engaged with the cam, respectively.

7. The shutter mechanism as claimed in claim 4, wherein the first and second operation members are further provided with rollers that are rotated by being engaged with the cam, respectively.

* * * * *